United States Patent [19]

Thomas et al.

[11] Patent Number: 5,151,899
[45] Date of Patent: Sep. 29, 1992

[54] TRACKING SEQUENCE NUMBERS IN PACKET DATA COMMUNICATION SYSTEM

[75] Inventors: Robert E. Thomas, Hudson; George Varghese, Bradford, both of Mass.; Robert J. Souza, Windham, N.H.; George A. Harvey, Maynard, Mass.

[73] Assignee: Digital Equipment Corporation, Maynard, Mass.

[21] Appl. No.: 654,067

[22] Filed: Feb. 11, 1991

[51] Int. Cl.⁵ ............................................... H04J 3/24
[52] U.S. Cl. ................................................. 370/94.1
[58] Field of Search ................ 370/94.1, 60, 100.1, 370/77, 55, 61, 94.2, 105.3; 364/200, 900

[56] References Cited

U.S. PATENT DOCUMENTS

| | | | |
|---|---|---|---|
| 4,439,859 | 3/1984 | Donnan | 371/32 |
| 4,564,937 | 1/1986 | Perry | 370/100.1 |
| 4,611,280 | 9/1986 | Linderman | 364/300 |
| 4,617,657 | 10/1986 | Drynan et al. | 370/60 |
| 4,631,673 | 12/1986 | Haas et al. | 364/300 |
| 4,646,235 | 2/1987 | Hirosawa et al. | 364/200 |
| 4,679,139 | 7/1987 | Durbin | 364/200 |
| 4,680,705 | 7/1987 | Shu | 364/300 |
| 4,799,215 | 1/1989 | Suzuki | 370/60 |
| 4,803,651 | 2/1989 | Galkowski | 364/900 |
| 4,918,687 | 4/1990 | Bustini | 370/61 |
| 4,964,119 | 10/1990 | Endo | 370/94.1 |
| 5,007,052 | 4/1991 | Flommer | 370/60 |
| 5,056,085 | 10/1991 | Vu | 370/60 |

Primary Examiner—Douglas W. Olms
Assistant Examiner—T. Samuel
Attorney, Agent, or Firm—Arnold, White & Durkee

[57] ABSTRACT

A packet data communication network employs sequence numbers in message packets to identify the packets transmitted for a message, so that the order of packets can be checked, and so that the occurrence of lost or duplicated packets can be detected. A method of keeping track of these sequence numbers is provided. Any number below or above a bounded sequence number acceptance window is ignored (not accepted). Bit maps are established for the range of numbers within the bounded window, each bit representing a sequence number and the bit maps indexed by sequence number. One bit map is a received packet map, used to keep track of which sequence numbers have been received and thus to filter duplicate sequence numbers. An end-of-message bit map is used to record the positions of packets having end-of-message flags, and this is used with the received packet map to determine whether all packets of a message have been received, so that an end-of-message trigger can be generated. The sequence number and an end-of-message flag from an incoming packet are used to update these bit maps as each packet is received, then the updated bit maps used to determine the needed action. Two methods are described for tracking these sequence numbers. Both methods have good average-case performance. The first method uses an iterative loop and is more suited for software implementation. The second method uses table lookup to replace the iterative loop and is more suited for hardware implementation. This method has very good worst-case performance.

34 Claims, 9 Drawing Sheets

```
struct PktSummaryEntryType (
    summaryType    newRecPktSummary;
    baseRowType    baseRowDelta; );

struct EOMSummaryEntryType (
    summaryType    newEndOfMsgSummary;
    boolean completeMsg; );

struct PktSummaryEntryType newPktSummaries         [ numOfRows     * (2**numOfRows)];
struct EOMSummaryEntryType newEndOfMsgSummaries [(numOfRows**2) * (2**numOfRows)];

/* Procedure to Initialize "newPktSummaries" and "newEndOfMsgSummaries" tables. */
InitSummaryBitTables ( ) (
    int index, currSummary, k, L, addr, rowIndex, baseRow,
        summary, delta;

for (rowIndex = 0;   rowIndex < numOfRows; rowIndex++) (
        for  (currSummary = 0;   currSummary < 2**numOfRows; currSummary++) (
            baseRow = rowIndex;
            index = baseRow * 2**numOfRows + currSummary;
            newPktSummaries [index] .baseRowDelta = 0;              /*    Init.    */ summary = currSummary;
            while    ((1 << baseRow) & summary) (
                ClearBit    (summary, baseRow, int);

baseRow = (baseRow + 1) % numOfRows;                /* Rotate baseRow. */
            )
```

FIG. 8B

```
/* Fill in newPktSummaries table entry. */
newPktSummaries [index] .newRecPktSummary = summary;
newPktSummaries [index] .newBaseRow = baseRow;

for  (k = 0;    k < numOfRows;  k++) (
     summary = currSummary;
     delta = k;
     baseRow = rowIndex;
     addr = (baseRow * numOfRows + k) * 2**numOfRows + currSummary;
     newEndOfMsgSummaries [addr] .completeMsg = FALSE;   /*   Init.  */ for   (L = 0;      L < delta;   L++) (
          If  (IsBitSet    (summary, baseRow, int) )   (
                          /* A msg is complete if any bit in summary is set along
                                                                 the way. */
               newEndOfMsgSummaries [addr] .completeMsg = TRUE;
               ClearBit      (summary, baseRow, int);
          )
          baseRow = (baseRow + 1)   %   numOfRows; /* Rotate baseRow. */
     )
     /* Fill in newEndOfMsgSummaries table entry. */
     newEndOfMsgSummaries [addr] .newEndOfMsgSummary = summary;
)

)   /* END PROCEDURE InitSummaryBitTables */
```

TRACKING SEQUENCE NUMBERS IN PACKET DATA COMMUNICATION SYSTEM

BACKGROUND OF THE INVENTION

This invention relates to packet data communications systems, and more particularly to methods of tracking sequence numbers used to identify message packets in communications systems.

In data communications networks, messages are usually split into small packets to conform to the communications protocol being used. For typical message traffic between digital processing stations in the network, an average-sized message may be split into a many packets, and this group of packets must be reassembled in the proper order at the receiving end. In addition, the receipt of all packets must be checked to see if any packets have been lost or duplicated in the transmission link. To keep track of the packets in such a system, the packets are assigned sequence numbers at some point at the transmitting end, either by the host computer or sending terminal, or by a protocol processor downstream of the host. At the receiving end, a processor must keep track of the sequence numbers and correlate incoming packet traffic by sequence numbers. The task is to keep track of sequence numbers in a large number space (e.g., a 32-bit sequence number) so that the actions(necessary to perform)associated with each sequence number are performed exactly once, in spite of duplicate or lost packets in the communications network.

There have been two basic alternatives for solving the problem of keeping track of sequence numbers in this environment. Both methods keep a base sequence number (baseSeq# as described below) similar to that discussed herein, but incremented in arbitrary units. The first alternative method keeps an ordered list for sequence numbers that arrive out-of-order. Whenever a new number arrives in order (i.e., matches the baseSeq#) the associated action is carried out and the baseSeq# is incremented, an operation which is quite efficient. However, if a sequence number arrives out of order because of network re-ordering or because a previous packet was lost, then the list must be scanned to detect duplicates and to insert the number in order in the list, an inefficient operation when a large number space is employed. Thus the amount of local processing at this step is very sensitive to the arrival order of the sequence numbers. This can very inefficient if re-ordering is common in the communications network. Also, the loop inherent in this method makes hardware implementation cumbersome.

The second prior method improves on the first alternative method by using hashing to reduce to a constant the average processing cost of the linear scan. Unfortunately, the worst case is still proportional to the maximum amount of out-of-orderliness. In addition, the worst case makes this method unsuitable for hardware implementation when insufficient buffering is available to absorb frequently occurring cases. If the cost of such buffering is significant or if guarantees have to be made that the buffering will not overflow, then the methods as described herein are clearly superior to all methods which have inferior worst case performance.

Thus, the prior methods of keeping track of sequence numbers in packet data communications systems have required an undue amount of processing by a receiver, or have required additional hardware in the form of buffering to a degree not otherwise needed. It is an objective to reduce the hardware burden and/or the processing burden, yet allow fast and reliable bookkeeping for sequence numbers.

SUMMARY OF THE INVENTION

In accordance with the invention, improved methods are provided for keeping track of sequence numbers as used for numbering packets in a data communication network. These methods assume a bounded sequence number acceptance window, so any number below or above the window is ignored (not accepted). A data structure in the form of a bit map is established within the bounded window of sequence numbers, each bit representing a sequence number and the bit map indexed by sequence number. Preferably the row size in the bit map is selected to correlate with the widths of the data paths of the processor. One bit map created is a received packet map, used to keep track of which sequence numbers have been received and thus to filter duplicate sequence numbers. The bit map can be searched much more efficiently than a record of the sequence numbers themselves, especially since only a window is acted upon.

If the method is to be used to recognize completed messages, as well as to detect duplicate sequence numbers, another bit map is constructed, referred to as an end-of-message map. This bit map is used to record the positions of packets having end-of-message flags, so that it is possible to determine whether or not all packets of a particular message have been received, and thus to generate an end-of-message trigger. The sequence number and an end-of-message flag from each incoming packet are used to update the two bit maps. When each packet is received, the updated bit maps are used to determine the needed action. When all bits in a row of the received packet map are set, the base row pointer is incremented to advance the acceptance window.

Completion of a message may be detected and indicated by noting that all bits are set in the current row of the received packet map up to the minimum bit number for which the corresponding end-of-message bit has been set. Another data structure can be maintained which is the value (column) of the minimum end-of-message bit in each row, and this can be used instead of finding the value in the end-of-message bit map every time a new packet is received.

Other features may be added, such as updating the data structure when a message is complete by zeroing bits in the end-of-message map up to that of a message just completed. One method of bookkeeping uses a loop to update the end of message map, and is useful if the receiver has processing power, i.e., a local processor. However, for hardwired logic implementations, the same general method is accomplished in an embodiment using table lookups instead of a loop. This second embodiment is a hierarchical method in which additional data structures are employed. A received-packet-summary and an end-of-message-summary are added, which are "higher" level bit maps. In either embodiment, the computational burden is minimal on the implementation chosen, and the speed is appropriate for high performance.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Figure 1:
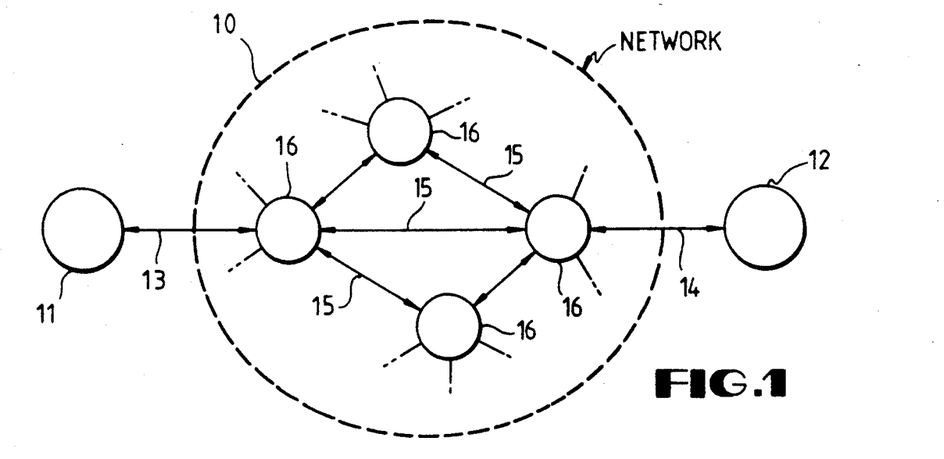
FIG. 1 is a diagram in block form of a packet data communication system which may use features of the invention.

Referring to FIG. 1, a communications network 10 of one type which may utilize the techniques of the invention is illustrated. This network is generally of conventional structure and operation, and is shown as an example of the type of system in which the concepts of the invention may be employed. The system includes a communications network 10 between a pair of nodes 11 and 12, it being understood that there may be many such nodes, perhaps hundreds or thousands, connected to the network. The nodes 11 and 12 are the host computers or terminals acting as the sources and destinations of the messages transmitted by the system, and usually will have an adapter or other facility for executing the network protocol and providing the physical connection 13 or 14 to the network. In some cases the protocol can be executed on the host computer itself, but this task may be offloaded to a protocol processor. The network 10 may include a number of links 15 among intermediate nodes 16, and some of these links 15 would ordinarily be trunk facilities, capable of simultaneous or time-multiplexed transmission of hundreds or thousands of separate channels or messages. The links 15 may include microwave or satellite link, or fibre optic link, as well as conventional wiring. The network 10 may be local or may span hundreds or thousands of miles.

In a communications network 10 of the type seen in FIG. 1, alternative paths may exist for a message sent from node 11 to node 12, so packets of a given message may be routed from source node 11 to destination node 12 by different routes illustrated by links 15. Network traffic is routed by paths having available bandwidth, according to the level of congestion existing from moment to moment within various links in the network. Thus, a message having a number of packets may have packets routed by diverse links 15, and so the packets may arrive at the destination out of order due to differing delays in the paths.

Figure 2:
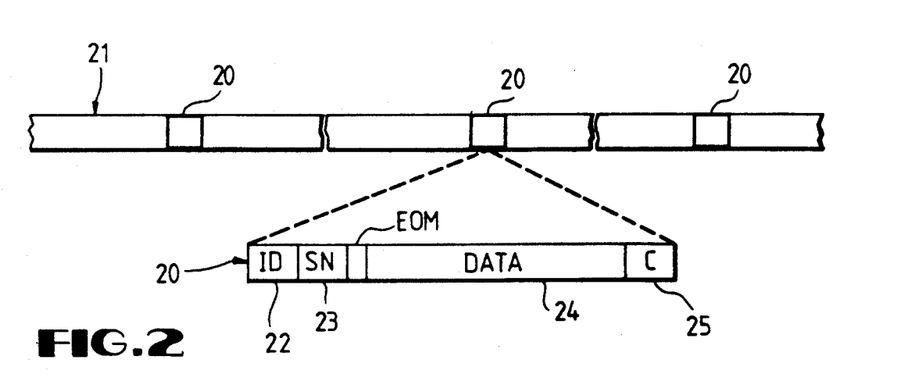
FIG. 2 is a diagram of one embodiment of a packet format which may be used in the system of FIG. 1.

Referring to FIG. 2, a message is carried on the network 10 (along each of the links 15) as a sequence of packets 20 in a message stream 21 of many other like messages from other sources to other destinations. The packets 20 of a message may be transported on a link 15 in a contiguous batch, but ordinarily they would be intermixed with packets of other messages, from diverse sources to diverse destinations. The message packets 20 could be of various formats, depending upon the protocol being executed and the transport mechanism, but each packet 20 would usually contain a message ID 22 identifying this as one of a defined sequence for one specific connection, virtual channel, or other category of message definition. The packet would include a sequence number 23 selected by a processor at the sending end (e.g., at the node 11), identifying this packet as to its position in a message. For example, if this complete message is 32-Kbits, and each packet 20 carries 512-bits in its data field 24, then sixty-four sequence numbers, e.g., 0-to-63, would be placed in the sixty-four packets 20 needed to transmit the message. In a typical embodiment, the sequence number is a 32-bit field, so the sequence numbers increase in sequence from zero to $2^{32}-1$. In addition, the packet 20 would ordinarily include a CRC field 25 for error checking, as is common practice. Usually the data field would contain an EOM or end-of-message flag, set to "1" only if this packet is the last packet in the message. The EOM flag is a zero for all packets other than the last one of a message.

Figure 3:
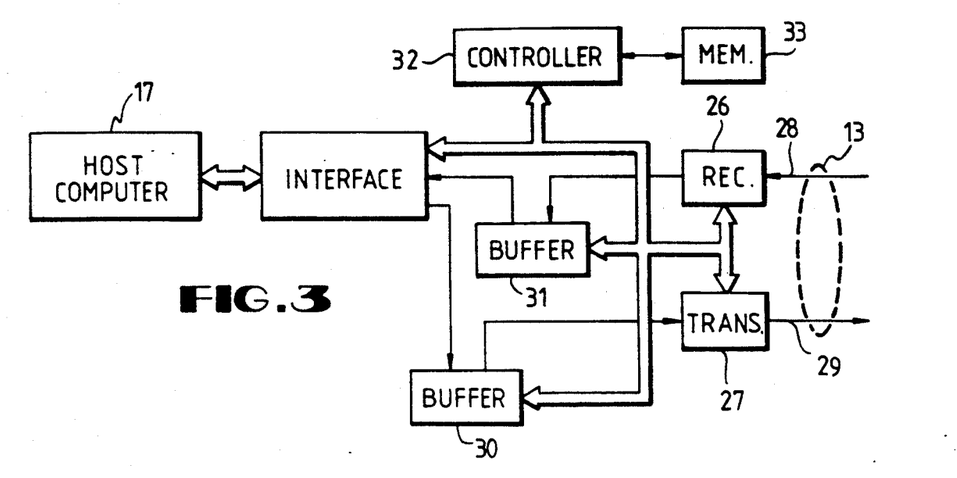
FIG. 3 is an electrical diagram in block form of one of the nodes in the system of FIG. 1, in an example of equipment for implementing the method of the invention.

Referring to FIG. 3, the construction of a node 11 or 12, as an example, would include a transmitter 27 and a receiver 26 connected to the transmit and receive lines or channels 28 and 29 of the link 13. Transmit and receive buffer memory units 30 and 31 hold the data stream 21 as indicated in FIG. 2 before and after transmission, and a controller 32 accesses these buffers to make up the message packets and message stream according to the protocol being used. The controller 32 also manages the operation of the transmitter and receiver 27 and 26, and loading of the buffers 30 and 31. The controller 32 may be a microprocessor, for example, or may be hardwired logic. A memory 33 would be accessed by the controller for program and data if it is of the microprocessor type, or may hold data for table lookup if the controller is of the hardwired typed. The sequence numbers 23, as used in the method according to the invention, may be assigned by the host computer terminals 17, or by the controller of an upstream protocol processor, or at some intermediate point, depending upon the type of system used and the type of protocol executed. That is, the method discussed below according to the invention operates at a receiving facility and assumes that the sequence numbers are assigned by upstream transmission facilities.

According to the invention, two methods are presents for keeping track of the sequence numbers 23 at the receiving end of a communications link. Either of these two methods may be used to increase the performance of datalink and/or transport communication protocols which must deal with lost or re-ordered frames or packets. The methods may be implemented in either software or hardware.

The basic problem to be solved in keeping track of sequence numbers in a very large number space (e.g., up to $2^{32}$). A large number is used for the sequence number 23 so that duplicates are never assigned within the time a packet can live within the network. The methods as described keep track of sequence numbers of packets so that the actions associated with each sequence number are performed exactly once (e.g., transfer a packet 20 to a transport user 17 or 18 in the order that the packet 20 was transmitted) in spite of duplicate or lost packets 20 in the communications network between a source 17 and destination 18. The consequences of performing an associated action more than once can be corruption of information and subsequent incorrect operation of a system. The consequence of not performing an action, when in fact the enabling conditions are present, is again incorrect operation of the system.

In the environment of communications networks such as that of FIG. 1, where a 32-bit sequence number 23 is associated with each packet 20 and these packets can be lost or duplicated within the network, keeping track of sequence numbers efficiently, i.e., without undue expenditure of hardware, software and/or computational resources, is a requirement. The computational cost of doing a search for 32-bit numbers in a range of 0-to-$2^{32}-1$ is a burden.

There are two methods of keeping track of sequence numbers disclosed herein. Both of the two closely related methods according to the invention have very good average and worst case performance. Either one can be implemented in either software or hardware. However, the first method is oriented towards software implementation and assumes that buffering (e.g., in the receive buffer 31) is used to smooth out differences in the arrival rate of sequence numbers and the processing of those sequence numbers. This is the usual assumption in virtually all current sequence number tracking implementations.

The second method has been specialized to have a very good worst case processing time. It is called the hierarchical method since it uses hierarchical data structures to reduce the worst case performance over the first method. This is important in order to eliminate any speed matching buffering that might otherwise be required. An example where this may be very important is in an optimal VLSI implementation of sequence number tracking.

Figure 4:
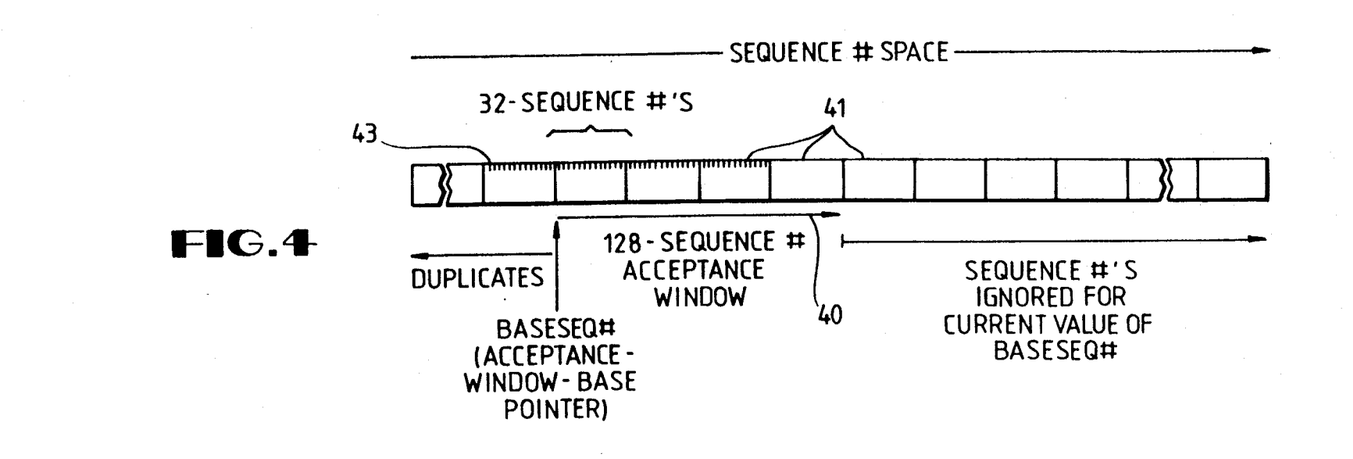
FIG. 4 is a diagram of an example of a sequence number acceptance window used in the method of the invention.

The method of the invention sets bounds on the sequence number that will be accepted at a given time, as illustrated in FIG. 4. A window of acceptance 40 is thus defined. Blocks or groups 41 of sequence numbers are illustrated in this window 40 in the sequence number space, with each block or group (called "roll"below) containing in this example bits for thirty-two sequence numbers 23 of FIG. 2. The lowest sequence number (base) in this window 40 is designated the "base sequence number" or baseSeq#43, a variable. All sequence numbers below baseSeq#43 represent those already received and processed, so these are called duplicates and are always ignored in the future. Sequence numbers above the window 40 must also be ignored since there is insufficient data structure in the method to contain the state of these numbers. In a communications network application such as that of FIG. 1, these sequence numbers above window 40 can be prevented from appearing in normal operation by using pessimistic flow control; e.g., a flow control signal is generated in node 11, for example, to prevent a node 13 or 17 from sending any more packets 20 after a number determined by the size of the window 40. Or they could be allowed to appear but could be safely dropped knowing that the transmitter 17 will retry until the sequence number is within the window 40.

By placing a bound on acceptable sequence numbers, such as the window 40, (e.g., 128 sequence numbers), a practical and efficient method is provided which allows a relative large amount of out-of-order behavior depending on how much memory is allocated for the data structures as described below.

Figure 5:
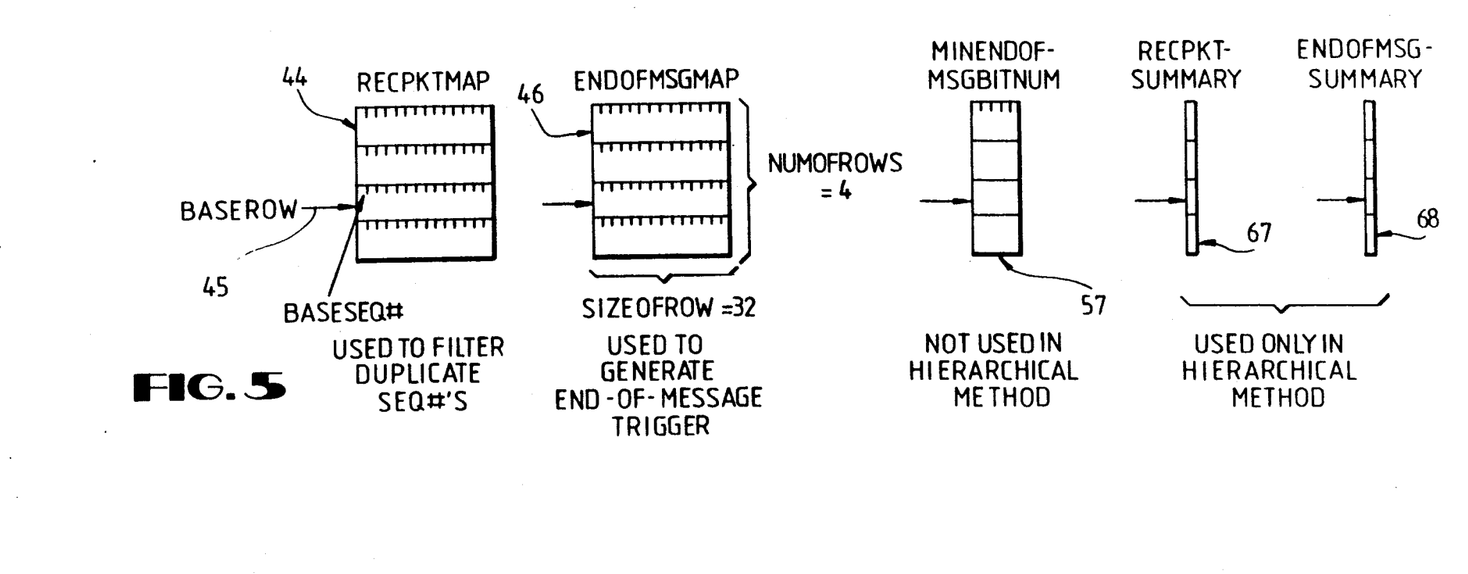
FIG. 5 is a diagram of data structures used in a one implementation of the method of the invention.

The sequence numbers within the window 40 of FIG. 4 are processed in the context of the data structures shown in FIG. 5 according to a method of example embodiments of the invention. This example uses a window of 128 sequence numbers, or four rows of thirty-two, and for this window a bitmap 44, called recPktMap, is defined in memory (e.g., in buffer 31 or memory 33), in the form of a circular buffer, thirty-two bits wide and four rows deep. A value called baseRow pointer 45 points to the current row in recPktMap 44. A corresponding bitmap 46 of the same size and configuration is defined, this one storing end-of-message bits and being called endOfMsgMap. The bitmap 44 is used to filter duplicate packets and the bitmap 46 is used to generate an end-of-message trigger.

Figure 6A:
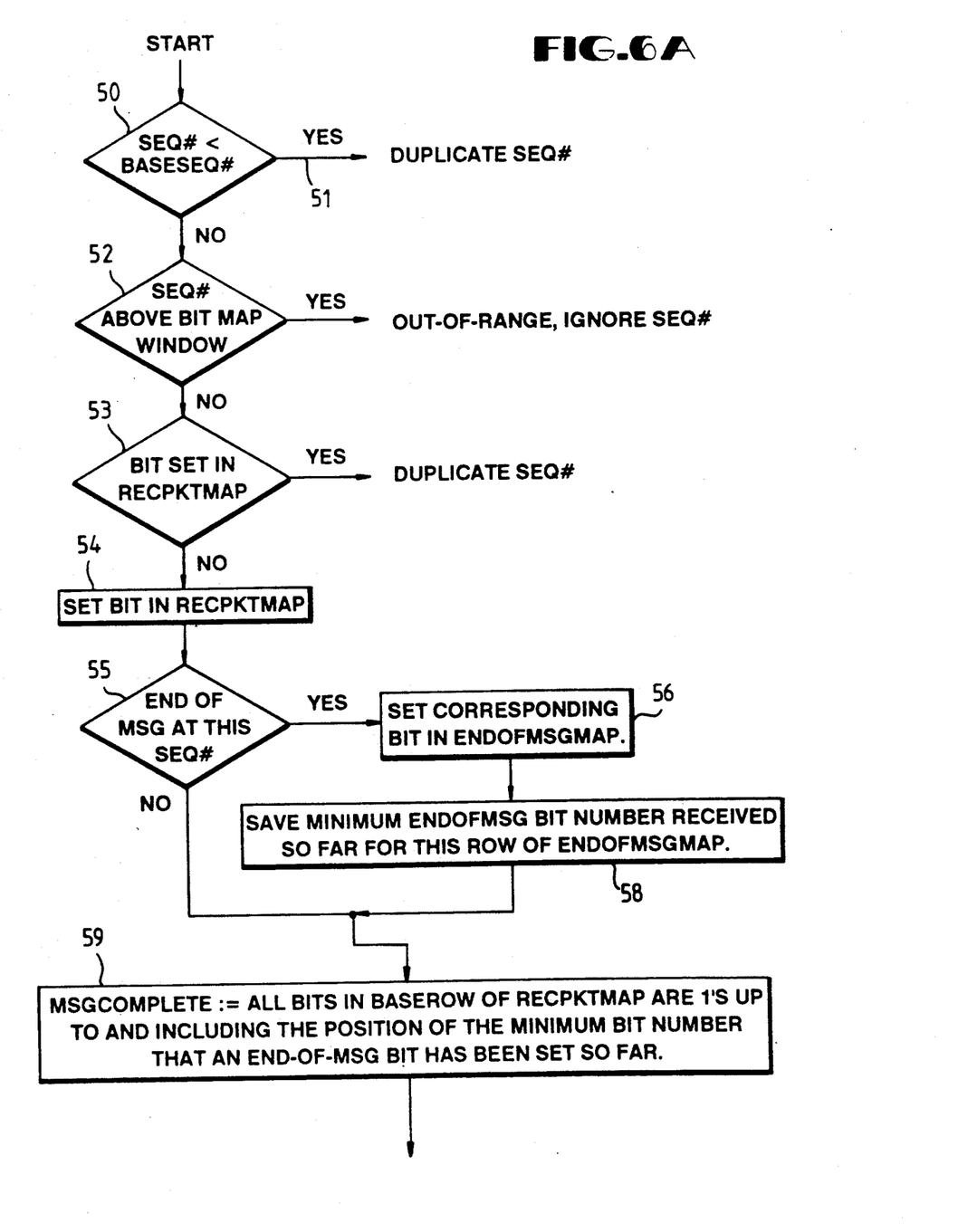
FIGS. 6A and 6B are a logic flow chart of a method of bookkeeping of sequence numbers according to one embodiment of the invention.
Figure 6B:
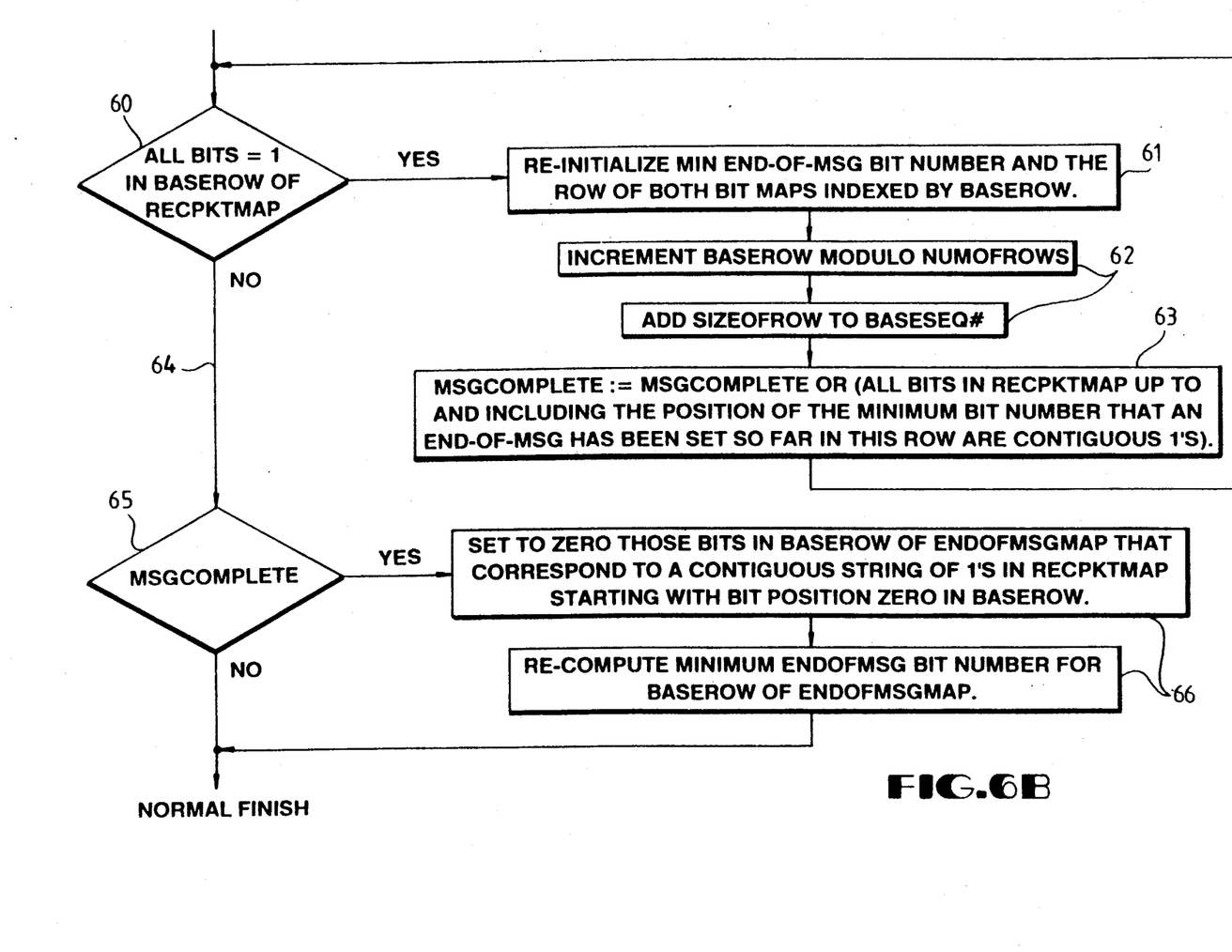
Figure 7A:
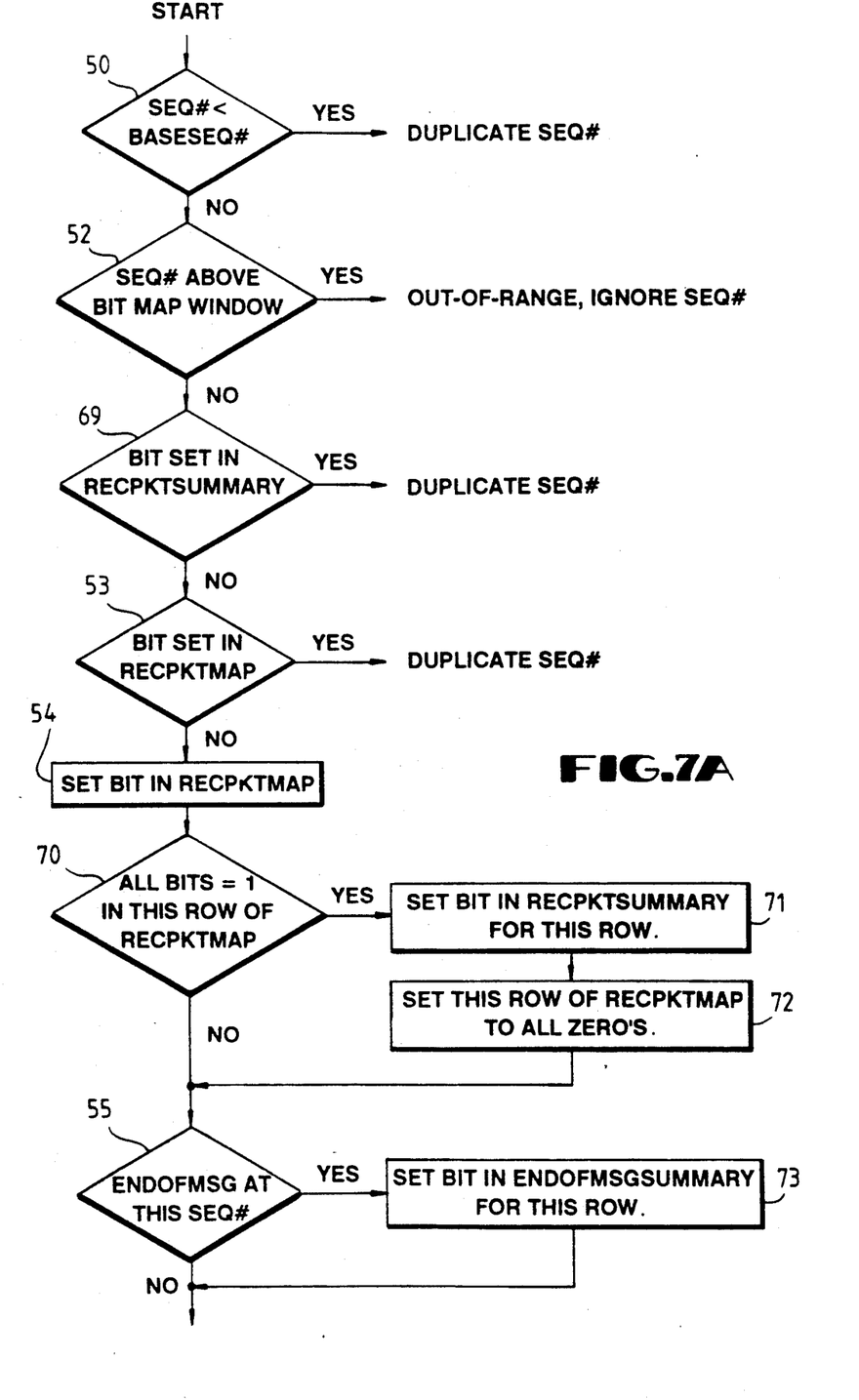
FIGS. 7A-7C are a logic flow chart of a method of bookkeeping of sequence numbers according to an alternative embodiment of the invention, using a hierarchical (loop-free) method.
Figure 7B:
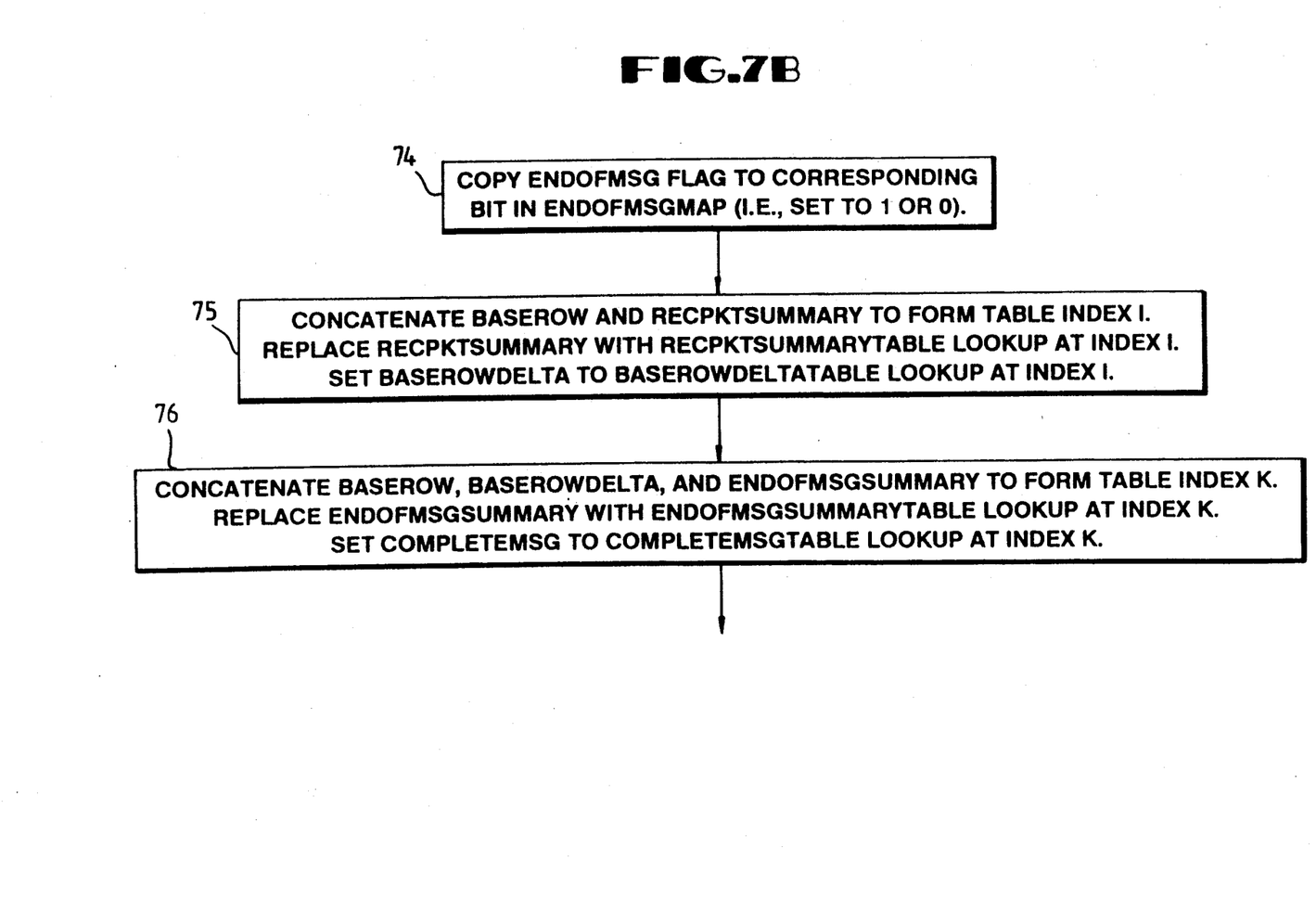
Figure 7E:
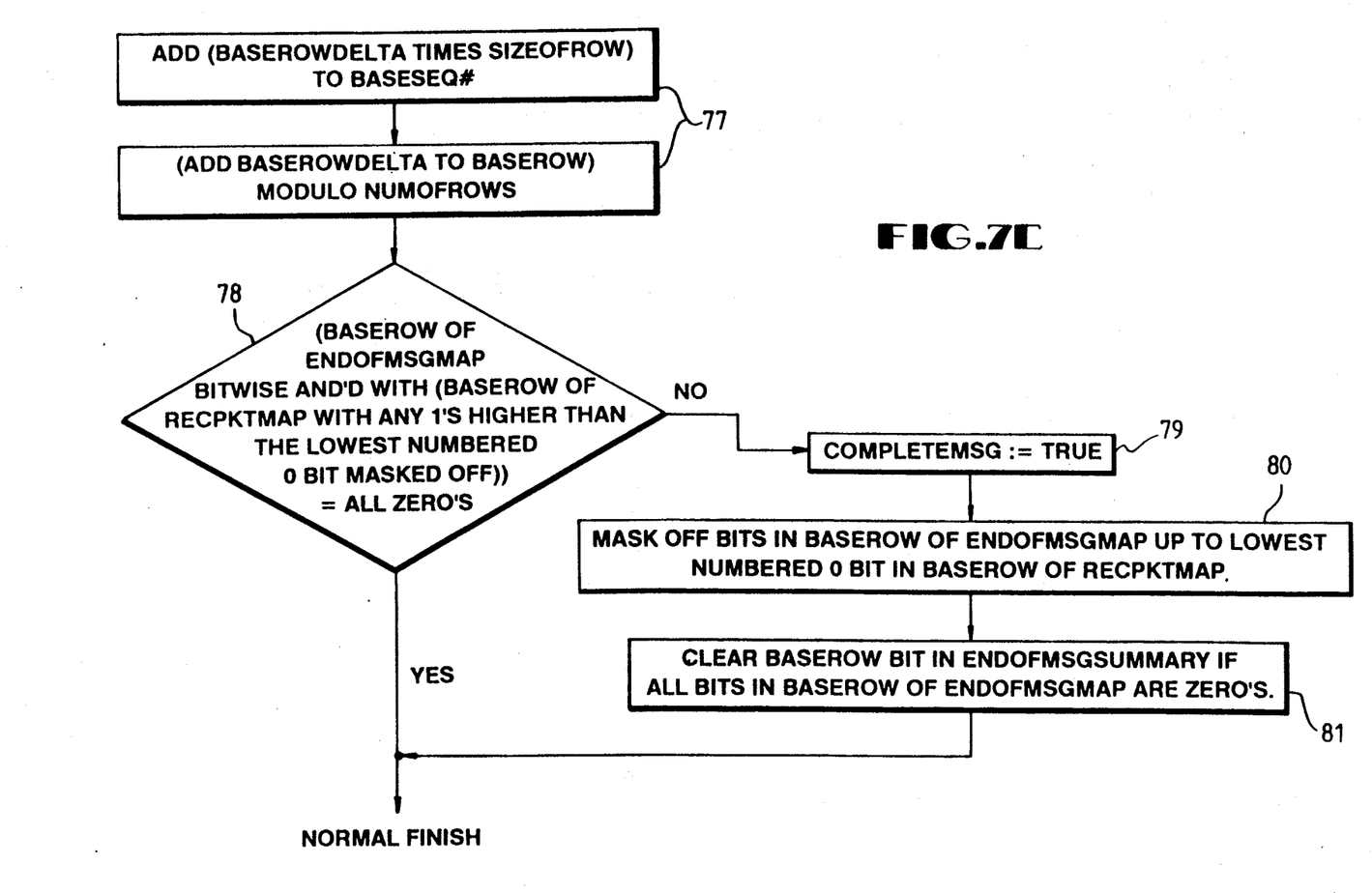
Figure 8A:
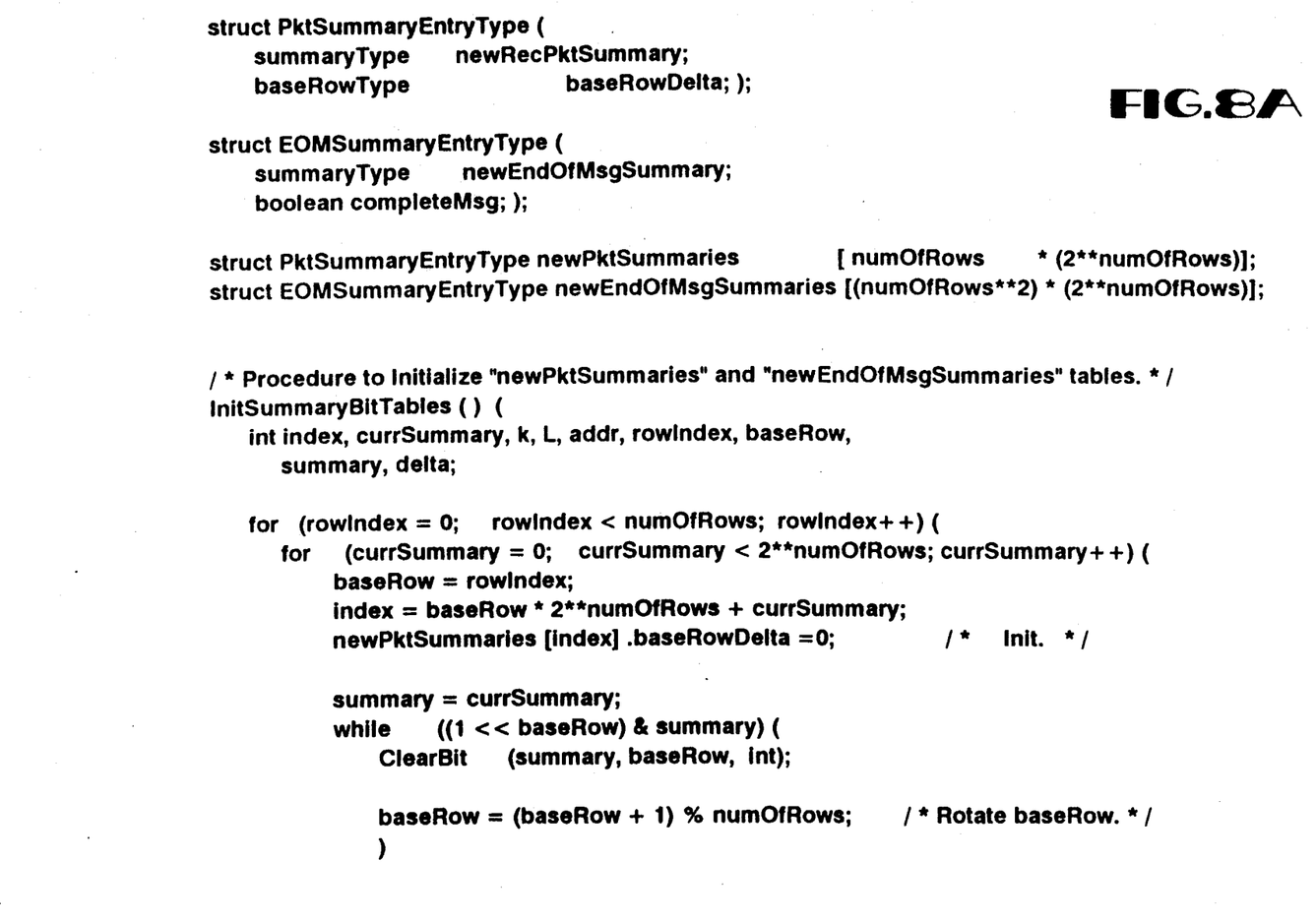
FIGS. 8A and 8B are a source code listing of a procedure for initializing certain tables used in the method of FIG. 7.
Figure 8B:
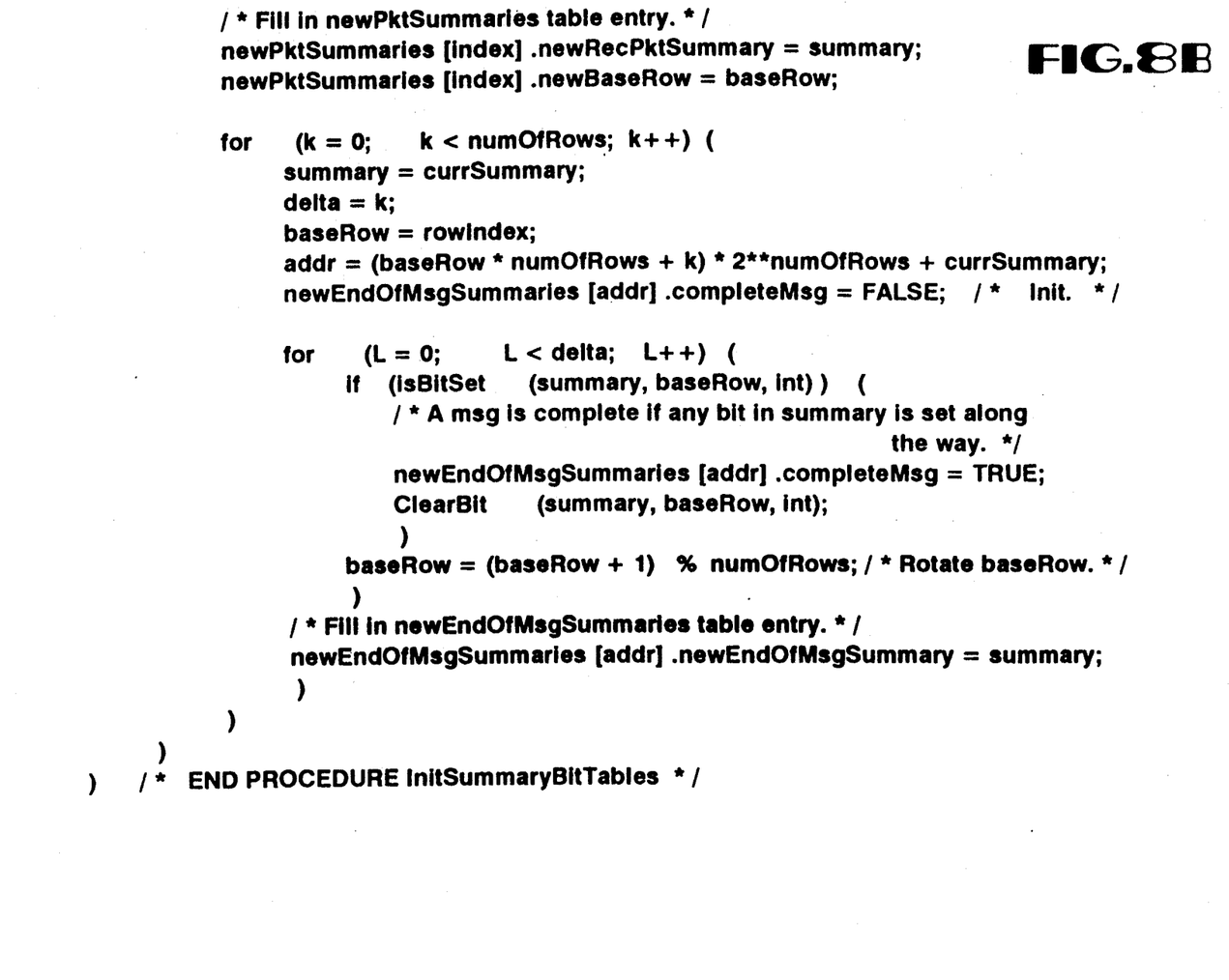

The two methods to be described are represented in the flow charts of FIGS. 6 and 7. Both methods (FIGS. 6 and 7) start with all bit maps initialized to zero's. Bit positions in each row of a bit map are numbered from 0 sizeOfRow-1 (i.e., 0-to-31 in the example). The value baseSeq# is set to the first sequence number that will ever be used, which for purposes of this description is equal to zero. Sequence numbers are then assumed to be assigned by some other entity in sequence starting with baseSeq#. Further assume that sequence numbers are presented to one of the following methods out of order with duplication. However, eventually all sequence numbers are given to the method.

SizeOfRow can be any convenient integer. Various values from 1-to-256 would function in both methods, although a power of 2 equal to the word size of the implementation machine is most convenient. The same is true for numOfRows for the first method, FIG. 6. For the hierarchical method, FIG. 7, numOfRows is assumed to be a power of 2.

Both methods also include the data structures and processing needed to provide a trigger for complete "messages". Messages are often provided in a communications transport protocol so that it is possible to communicate a larger unit of information (i.e., a "message") than is supported by the underlying communication layer (i.e., a "packet"), as referred to above.

A message, as used in reference to the methods of the invention, is a number of packets having a set of contiguous sequence numbers, delimited from other sequence numbers (others messages) by the EOM flags. Each sequence number has an EOM flag associated with it, but only the EOM flag in the last packet of a message is set to "1", all preceding flags being zero. For example, the string of end-of-message bits 0000010000101 indicates three messages as they would appear in bit map 46. The first message is composed of six sequence numbers, the second with five sequence numbers, and the third has only two sequence numbers. Messages may be completed at a receiver out-of-order as a consequence their packets arriving out of order so that their sequence numbers are entered into the bit maps 44, 46 out-of-order. However, it is generally desired that the sequence number tracking method provide notification to the user only for complete messages in order of increasing sequence numbers. Thus, if message #2 is completed before the last packet of message #1 is received, the user is not notified; instead, when the last packet of #1 is received, a message-complete signal is given, which in this case is for two messages.

End-of-message processing is shown in the methods of FIGS. 6 and 7 to show that this common functionality can be easily accomplished by both methods. The output of end-of-message processing is a bit called "msgComplete" which indicates that the processing of the current sequence number completes one (or more) messages. It does not provide the number of messages completed nor does it provide the sequence number of the last message completed, although processing for this information could be added to FIG. 6 without changing its fundamental properties. This is not the case for FIG. 7. In both methods the end-of-message processing with minor modifications can be used for other similar functionality. For example, some transports have a reqAck bit which triggers an acknowledgment packet when the sequence is complete up to the sequence number indicated. Only one acknowledgment, the highest sequence number possible whether it has reqAck or not, is triggered in this case. This functionality can be added to both methods without changing their fundamental properties. Neither end-of-message nor reqAck processing is fundamental nor essential to either method and thus is entirely optional.

The first example of a method of processing a sequence number according to an embodiment of the invention is illustrated in flow chart form in FIG. 6. The initial part of the method is to check whether the sequence number is less than baseSeq# (in which case the packet is ignored as a duplicate), then the method checks to see if the sequence number is greater than the acceptance window 40 (in which case the packet is ignored since it is out of range). Thus, in the first block 50, the sequence number presented to the method (e.g., by reception of a packet 20 having a sequence number 23) is compared to the value baseSeq#, and if less than baseSeq# the packet 20 is discarded as being a duplicate, via path 51 of the flow chart. If not, control passes to block 52 where the sequence number is compared to the maximum value of the window 40, and if above then the packet is discarded as out-of-range; the resultant need for retransmittal of a good packet 20 is less burdensome than providing data structures to handle sequence numbers without bound. If not above the maximum number in window 40, control passes to a block 53, where the bitmap 44 is checked to see if this sequence number has been already received. To this end, the address of the bit in bitmap 44 must be generated.

The location in the bitmaps 44 and 46 for a given sequence number is computed by first determining the baseRow number by.

(baseSeq#/sizeOfRow) MOD numOfRows or alternatively the baseRow can be maintained as part of the bookkeeping state as long as it has the same value. A bitmap row index and a bit position within the row for the sequence number is computed in similar fashion using simple subtraction, division, and MOD (or bit shifts instead of divison and bit field extraction instead of MOD if sizeOfRow and numOfRow are powers of 2).

If the bit at the computed bit position in recPktMap 44 is a 1, then ignore the sequence number as a duplicate as indicated by decision block 53 of FIG. 6. Otherwise, set the bit at the computed position of bit map 44 as indicated by the block 54. As indicated by decision block 55, if endOfMsg (EOM flag) in the packet with this sequence number is a 1, then set the bit in endOfMsgMap 46 using the same computed bit position, as indicated by block 56. Also, compare the bit position with the value for this row in the stored values called minEndOfMsgBitNum 57 of FIG. 5, and if the bit position is lower, store it in minEndOfMsgBitNum as indicated by block 58 FIG. 6. The stored values called minEndOfMsgBitNum 57 is used to avoid the need to "find the least bit number of a 1 in a bit map row" (hereafter called FindFirstOneBit) which may be somewhat expensive in software (note, "loop unrolling" and table lookup can be used to make it relatively low cost). If it is not expensive at all, e.g., it is provided as a 1 or 2-cycle instruction, then minEndOfMsgBitNum 57 could be deleted with only minor adjustments to the method. The method in FIG. 6 starts with each row of minEndOfMsgBitNum equal to or greater than sizeOfRow, and the value stored for each row is lowered as EOM flags come in.

The msgComplete bit can now be computed as indicated by block 59 by first constructing a mask of all 1 bits up to and including the bit position equal to minEndOfMsgBitNum in baseRow (this can be done quickly with a table which has sizeOfRow entries by sizeOfRow bits). Second, bitwise AND the mask with the baseRow of recPktMap and compare it with a copy of the mask. If equal, then the sequence numbers are now complete up to and including at least the lowest numbered 1 bit in baseRow of endOfMsgMap.

Next, as indicated by the block 60, check if the baseRow of recPktMap 44 is all 1's which is a simple arithmetic comparison if sizeOfRow is less than or equal to the word size of the implementation machine. If true then execute the body of the loop which firstly, at block 61, re-initializes (i.e., zeros) the baseRow of the data structures, secondly at blocks 62 increments baseRow MOD numOfRows and adds sizeOfRow to baseSeq#, and thirdly at block 63 re-computes the msgComplete bit the same as above.

When the loop terminates (all bits not=1 by path 64), msgComplete is checked at block 65 and if TRUE it is necessary to update the baseRow entries of endOfMsgMap and minEndOfMSgBitNum as indicated by blocks 66. The low order bits of endOfMsgMap are cleared by using FindFirstOneBit on the one's complement of the baseRow of recPktMap, constructing a mask as above, and bitwise AND'ing the mask with the baseRow of endOfMsgMap. This prevents these bits from triggering duplicate msgComplete signals. Whenever some bits are cleared in a row of endOfMsgMap, it is necessary to use FindFirstOneBit to update the value of minEndOfMSgBitNum for the same row. These two calls to FindFirstOneBit are the only ones necessary and they are only needed for the msgComplete signal.

The method in FIG. 6 for sequence number bookkeeping is now complete. Any actions (unspecified here) associated with the given sequence number and msgComplete signal can now be safely considered for execution as long as the method terminated at the "normal finish" point. In some applications, the associated action will need to be delayed by some means until a signal such as msgComplete occurs. This would allow the actions to be executed in the same order as the sequence numbers were assigned.

The method in FIG. 7 is very similar to that of FIG. 6. The check for whether the sequence number is below or above the range 40 is the same in blocks 50 and 52. The method of FIG. 7 differs in two significant ways.

Firstly, a recPktSummary 67 and an endOfMsgSummary 68 have been added as "higher" level bit maps in the data structures of FIG. 5. Each bit in recPktSummary 67 is a substitute for an entire row of 1 bits in recPktMap 44 with the row number in recPktMap 44 corresponding to the bit position in recPktSummary 67. It is a "substitute" because in fact the row in recPktMap 44 is set to all zero's when the summary bit is set. So, as each row in bitmap 44 fills up, the corresponding bit of recPktSummary 67 is set. Likewise, the endOfMsgSummary 68 is summary of the contents of endOfMsg bit map 46; if any bit in a row of map 46 is a 1, then the corresponding bit of endOfMsgSummary 68 is set, but since the bit map 46 is not reinitialized the setting of bits in summary 68 is more complex. The bits in endOfMsgSummary 68, more precisely, mean that if any bit in the corresponding row of the bitwise AND of endOfMsgMap 46 and recPktMap 44 are 1 then the summary bit is set. In this case, it is necessary to bitwise AND the corresponding row of recPktMap 44 with bitmap 46 because endOfMsgMap 46 is not re-initialized when the circular buffer rotates and in fact endOfMsgMap 46 may start with any value whatsoever. The re-initialization of the bit maps is the major reason for the less-than-optimal worst case of the method in FIG. 6. The hierarchical method minimizes the worst case path by moving this initialization work to a path which is not a worst case. This sort of "case balancing" is very useful in the design of "real time" hardware implementations.

In the flow chart of FIG. 7, block 69 reflects checking the bit set in recPktSummary 67 before the bit set in recPktMap 44 of block 53, since the summary takes precedence over the bit map. If the sequence number is not a duplicate, the bit is set in recPktMap, block 54. After the update for the current packet, the check for all bits equal 1 in this row of recPktMap is at block 70; if so the bit in recPktSummary 67 is set at block 71 and this row of recPktMap is set to zeros at block 72. The check for endOfMsg at this sequence number is made at block 55 as before and if yes then as indicated in block 73 (as just described) the bit in endOfMsgSummary 68 for this row is set.

The second significant difference in the method of FIG. 7 is that the loop of blocks 60, 61, 62, 63 of FIG. 6 has been replaced in the hierarchical method with two table lookups which return two values each. Another minor difference is that the minEndOfMsgBitNum array 57 (block 58) is not used since it is assumed that the FindFirstOneBit operation would take only one cycle. (MinEndOfMsgBitNum could be added with only minor changes.)

As indicated by block 74, the endOfMsg flag associated with the just-received sequence number is copied (i.e., set to 1 or 0) to the endOfMsgMap 46 since this is the only time that this position of endOfMsgMap 46 is set to the correct value. (It is not otherwise initialized even in the beginning).

In the next step, seen as block 75, a table index is formed by concatenating the bits in the baseRow pointer 45 with the value in recPktSummary 67. The recPktSummary is replaced with the value from a table at that index. The value of baseRowDelta is also returned from the table. BaseRowDelta is the amount that baseRow is going to change as a result of processing the current sequence number. The method for computing this table is given in the procedure of FIG. 8 where it is called newPktSummaries with fields newRecPktSummary and baseRowDelta. The number of entries in the table is numOfRows * $2^{numOfRows}$ The total size of each entry is numOfRows + LOG2(numOfRows) bits The table look ups mentioned in FIG. 7 are from tables generated by the method given in FIG. 8. Once the size of row and the number of rows are decided upon, the tables can be generated and remain static; no change in the tables is needed so long as the window size, number of rows, and row size are fixed. An example table computed by this method is given in Table A below. In Table A, the upper table shows two values at each entry, one being a new number (in hex) for inserting in recPktSummary 67, and the second being baseRowDelta—the amount to add to the base row pointer 45. The lower table of Table A also shows two values, the first being a new endOfMsgSummary and the second being a value for complete Msg.

The next step, indicated by the block 76 of FIG. 7, is to form a table index k by concatenating baseRow, baseRowDelta, and endOfMsgSummary. The endOfMsgSummary 68 is replaced with endOfMsgSummaryTable lookup at index k. The completeMsg is set to completeMsgTable lookup at index k. Then, at blocks 77, the value (baseRowDelta times sizeOfRow) is added to baseSeq#, and the operation (Add baseRowDelta to baseRow) modulo numofRows is performed to update the base row pointer.

Then, at decision block 78, the value {baseRow of endOfMsgMap bitwise AND'd with (baseRow of recPktMap with any 1's higher than the lowest numbered 0 bit masked of)} is checked for all zero's. If so, normal finish occurs. If not, completeMsg is set TRUE (block 79), and at block 80 bits in baseRow of endOfMsgMap are masked off up to lowest numbered zero bit in baseRow recPktMap. The baseRow in endOfMsgSummary 68 is cleared if all bits in baseRow of endOfMsgMap 46 are zero's block 81, and thus to normal finish.

Thus, the data structures are updated without a software loop, so the operations of FIG. 7 can be done by hardwired logic.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE A

Example Tables for Hierarchical Method
/* Example tables for numOfRows = 4 and sizeOfRow = 32
computed by InitSummaryBitTables. */

| static struct PktSummaryEntryType newPktSummaries [] = { | | | |
|---|---|---|---|
| { 0, 0 }, | { 0, 1 }, | { 2, 0 }, | { 0, 2 }, |
| { 4, 0 }, | { 4, 1 }, | { 6, 0 }, | { 0, 3 }, |
| { 8, 0 }, | { 8, 1 }, | { a, 0 }, | { 8, 2 }, |
| { c, 0 }, | { c, 1 }, | { e, 0 }, | { 0, 4 }, |
| { 0, 0 }, | { 1, 0 }, | { 0, 1 }, | { 1, 1 }, |
| { 4, 0 }, | { 5, 0 }, | { 0, 2 }, | { 1, 2 }, |
| { 8, 0 }, | { 9, 0 }, | { 8, 1 }, | { 9, 1 }, |
| { c, 0 }, | { d, 0 }, | { 0, 3 }, | { 0, 4 }, |
| { 0, 0 }, | { 1, 0 }, | { 2, 0 }, | { 3, 0 }, |
| { 0, 1 }, | { 1, 1 }, | { 2, 1 }, | { 3, 1 }, |
| { 8, 0 }, | { 9, 0 }, | { a, 0 }, | { b, 0 }, |
| { 0, 2 }, | { 0, 3 }, | { 2, 2 }, | { 0, 4 }, |
| { 0, 0 }, | { 1, 0 }, | { 2, 0 }, | { 3, 0 }, |

TABLE A-continued

Example Tables for Hierarchical Method
/* Example tables for numOfRows = 4 and sizeOfRow = 32
computed by InitSummaryBitTables. */

| | | | |
|---|---|---|---|
| { 4, 0 }, | { 5, 0 }, | { 6, 0 }, | { 7, 0 }, |
| { 0, 1 }, | { 0, 2 }, | { 2, 1 }, | { 0, 3 }, |
| { 4, 1 }, | { 4, 2 }, | { 6, 1 }, | { 0, 4 } |

};
static struct EOMSummaryEntryType new EOMSummaries [] = {

| | | | |
|---|---|---|---|
| { 0, 0 }, | { 1, 0 }, | { 2, 0 }, | { 3, 0 }, |
| { 4, 0 }, | { 5, 0 }, | { 6, 0 }, | { 7, 0 }, |
| { 8, 0 }, | { 9, 0 }, | { a, 0 }, | { b, 0 }, |
| { c, 0 }, | { d, 0 }, | { e, 0 }, | { f, 0 }, |
| { 0, 0 }, | { 0, 1 }, | { 2, 0 }, | { 2, 1 }, |
| { 4, 0 }, | { 4, 1 }, | { 6, 0 }, | { 6, 1 }, |
| { 8, 0 }, | { 8, 1 }, | { a, 0 }, | { a, 1 }, |
| { c, 0 }, | { c, 1 }, | { e, 0 }, | { e, 1 }, |
| { 0, 0 }, | { 0, 1 }, | { 0, 1 }, | { 0, 1 }, |
| { 4, 0 }, | { 4, 1 }, | { 4, 1 }, | { 4, 1 }, |
| { 8, 0 }, | { 8, 1 }, | { 8, 1 }, | { 8, 1 }, |
| { c, 0 }, | { c, 1 }, | { c, 1 }, | { c, 1 }, |
| { 0, 0 }, | { 0, 1 }, | { 0, 1 }, | { 0, 1 }, |
| { 0, 1 }, | { 0, 1 }, | { 0, 1 }, | { 0, 1 }, |
| { 8, 0 }, | { 8, 1 }, | { 8, 1 }, | { 8, 1 }, |
| { 8, 1 }, | { 8, 1 }, | { 8, 1 }, | { 8, 1 }, |
| { 0, 0 }, | { 1, 0 }, | { 2, 0 }, | { 3, 0 }, |
| { 4, 0 }, | { 5, 0 }, | { 6, 0 }, | { 7, 0 }, |
| { 8, 0 }, | { 9, 0 }, | { a, 0 }, | { b, 0 }, |
| { c, 0 }, | { d, 0 }, | { e, 0 }, | { f, 0 }, |
| { 0, 0 }, | { 1, 0 }, | { 0, 1 }, | { 1, 1 }, |
| { 4, 0 }, | { 5, 0 }, | { 4, 1 }, | { 5, 1 }, |
| { 8, 0 }, | { 9, 0 }, | { 8, 1 }, | { 9, 1 }, |
| { c, 0 }, | { d, 0 }, | { c, 1 }, | { d, 1 }, |
| { 0, 0 }, | { 1, 0 }, | { 0, 1 }, | { 1, 1 }, |
| { 0, 1 }, | { 1, 1 }, | { 0, 1 }, | { 1, 1 }, |
| { 8, 0 }, | { 9, 0 }, | { 8, 1 }, | { 9, 1 }, |
| { 8, 1 }, | { 9, 1 }, | { 8, 1 }, | { 9, 1 }, |
| { 0, 0 }, | { 1, 0 }, | { 0, 1 }, | { 1, 1 }, |
| { 0, 1 }, | { 1, 1 }, | { 0, 1 }, | { 1, 1 }, |
| { 0, 1 }, | { 1, 1 }, | { 0, 1 }, | { 1, 1 }, |
| { 0, 1 }, | { 1, 1 }, | { 0, 1 }, | { 1, 1 }, |
| { 0, 0 }, | { 1, 0 }, | { 2, 0 }, | { 3, 0 }, |
| { 4, 0 }, | { 5, 0 }, | { 6, 0 }, | { 7, 0 }, |
| { 8, 0 }, | { 9, 0 }, | { a, 0 }, | { b, 0 }, |
| { c, 0 }, | { d, 0 }, | { e, 0 }, | { f, 0 }, |
| { 0, 0 }, | { 1, 0 }, | { 2, 0 }, | { 3, 0 }, |
| { 0, 1 }, | { 1, 1 }, | { 2, 1 }, | { 3, 1 }, |
| { 8, 0 }, | { 9, 0 }, | { a, 0 }, | { b, 0 }, |
| { 8, 1 }, | { 9, 1 }, | { a, 1 }, | { b, 1 }, |
| { 0, 0 }, | { 1, 0 }, | { 2, 0 }, | { 3, 0 }, |
| { 0, 1 }, | { 1, 1 }, | { 2, 1 }, | { 3, 1 }, |
| { 0, 1 }, | { 1, 1 }, | { 2, 1 }, | { 3, 1 }, |
| { 0, 1 }, | { 1, 1 }, | { 2, 1 }, | { 3, 1 }, |
| { 0, 0 }, | { 0, 1 }, | { 2, 0 }, | { 2, 1 }, |
| { 0, 1 }, | { 0, 1 }, | { 2, 1 }, | { 2, 1 }, |
| { 0, 1 }, | { 0, 1 }, | { 2, 1 }, | { 2, 1 }, |
| { 0, 1 }, | { 0, 1 }, | { 2, 1 }, | { 2, 1 }, |
| { 0, 0 }, | { 1, 0 }, | { 2, 0 }, | { 3, 0 }, |
| { 4, 0 }, | { 5, 0 }, | { 6, 0 }, | { 7, 0 }, |
| { 8, 0 }, | { 9, 0 }, | { a, 0 }, | { b, 0 }, |
| { c, 0 }, | { d, 0 }, | { e, 0 }, | { f, 0 }, |
| { 0, 0 }, | { 1, 0 }, | { 2, 0 }, | { 3, 0 }, |
| { 4, 0 }, | { 5, 0 }, | { 6, 0 }, | { 7, 0 }, |
| { 0, 1 }, | { 1, 1 }, | { 2, 1 }, | { 3, 1 }, |
| { 4, 1 }, | { 5, 1 }, | { 6, 1 }, | { 7, 1 }, |
| { 0, 0 }, | { 0, 1 }, | { 2, 0 }, | { 2, 1 }, |
| { 4, 0 }, | { 4, 1 }, | { 6, 0 }, | { 6, 1 }, |
| { 0, 1 }, | { 0, 1 }, | { 2, 1 }, | { 2, 1 }, |
| { 4, 1 }, | { 4, 1 }, | { 6, 1 }, | { 6, 1 }, |
| { 0, 0 }, | { 0, 1 }, | { 0, 1 }, | { 0, 1 }, |
| { 4, 0 }, | { 4, 1 }, | { 4, 1 }, | { 4, 1 }, |
| { 0, 1 }, | { 0, 1 }, | { 0, 1 }, | { 0, 1 }, |
| { 4, 1 }, | { 4, 1 }, | { 4, 1 }, | { 4, 1 }, |

};

What is claimed is:

1. A method of tracking sequence numbers for message packets in a packet data transmission system, comprising the steps of:

a) assigning sequence numbers in order to a series of packets transmitted from a source to a destination;

b) at said destination, defining an acceptable range of said sequence numbers, said range beginning at a base sequence number and extending for a window which is a small fraction of the available sequence numbers;

c) comparing the sequence number of each message packet received at said station with said acceptable range;

d) discarding all message packets having sequence numbers not within said range;

e) maintaining at said destination a first bit map, and indexing into said first bit map to a sequence number index position representing the sequence number of a packet received at said destination; and f) for said packet received at said destination, checking its sequence number index position in said first bit map, and discarding said packet if said sequence number index position contains an indication that a packet of the sequence number of this index position has already been received, or, if said index position does not contain said indication, then storing an indication at said index position that a packet has been received.

2. A method according to claim 1 including the step of checking to determine if an incoming packet is an end-of-massage packet, and, if so, changing the condition of a corresponding bit in an end-of-message bit map indexed by sequence number.

3. A method according to claim 2 including the steps of checking to determine if all sequence numbers prior to said corresponding bit in said end-of-message bit map contain said indication in said first bit map, and, if so, providing an end-of-message indication and zeroing all bits in said end-of-message bit map up to the current sequence number.

4. A method according to claim 1 wherein said first bit map is a data array having M rows of N bits per row, and is of the same size as said window.

5. A method according to claim 4 wherein said end-of-message bit map is a data array having M rows of N bits per row.

6. A method according to claim 5 wherein N is a power of 2 and equal to the data path width of processing means in said station, and wherein M is a power of 2, and said window is of a size M times N.

7. A method according to claim 1 including the steps of maintaining a first multi-bit value having a bit which is in a selected condition for each row of said first bit map with all bits containing said indication, generating a table of said first multi-bit values for all combinations of bits in said selected condition, and looking up in said table a new first nulti-bit value when a sequence number is received.

8. A method of tracking sequence numbers in a packet data receiver for use in a transmission system employing sequence numbers for message packets, comprising the steps of:

a) receiving message packets having sequence numbers;

b) comparing each received sequence number with an acceptable range of said sequence numbers in a window extending from a beginning sequence number for a small fraction of the available sequence numbers;

c) discarding a received message packet having a sequence number not within said window;

d) maintaining a first bit map indexed by sequence number in which a bit is placed in a selected condition for each packet received; and e) checking the first bit map upon receiving each packet and discarding any packet having a sequence number indexing into said first bit map to a bit already in said selected condition in said bit map.

9. A method according to claim 8 including the steps of checking to determine if an incoming packet is an end-of-massage packet, and, if so, placing in a given condition a corresponding bit in an end-of-message bit map indexed by sequence number.

10. A method according to claim 9 including the steps of checking to determine if bits are in said selected condition in said first bit map for sequence numbers of a message prior to said bit in said given condition in said end-of-message bit map, and, if so, providing an end-of-message indication.

11. A method according to claim 9 including the step of zeroing all bits in said end-of-message bit map up to the current sequence number if said end-of-message indication is provided.

12. A method according to claim 8 wherein said first bit map is a data array having M rows of N bits per row, and is of the same size as said window.

13. A method according to claim 12 wherein said end-of-message bit map is a data array having M rows of N bits per row.

14. A method according to claim 13 wherein N is a power of 2 and equal to the data path width of processing means in said station, and wherein M is a power of 2, and said window is of a size M times N.

15. A method according to claim 8 including the steps of maintaining a first multi-bit value having a bit which is a logic "1" for each row of said first bit map with all bits in said selected condition, generating a table of said first multi-bit values for all combinations of bits, and looking up in said table a new first multi-bit value when a sequence number is received.

16. A packet data receiver apparatus for use in a transmission system employing sequence numbers for message packets, comprising:

a) means for receiving message packets having sequence numbers;

b) means for comparing each sequence number with a window defining an acceptable range of said sequence numbers, said window beginning at a base sequence number and extending for a small fraction of the available sequence numbers, and for discarding a received message packet having a sequence number not within said range;

c) means for maintaining a first bit map indexed by sequence number in which a bit is placed in a given condition for each packet received; and d) means for checking the first bit map upon receiving each packet and discarding any packet having a sequence number indexing into said first bit map to a bit already in said given condition.

17. Apparatus according to claim 16 including means for checking to determine if an incoming packet is an end-of-massage packet, and, if so, placing in a selected condition a corresponding bit in an end-of-message bit map indexed by sequence number.

18. Apparatus according to claim 17 including means for checking to determine if bits are in said given condition in said first bit map for sequence numbers of a message prior to said bit in said selected condition in said end-of-message bit map, and, if so, providing an end-of-message indication.

19. Apparatus according to claim 18 including means for zeroing all bits in said end-of-message bit map up to the current sequence number if said end-of-message indication is provided.

20. Apparatus according to claim 19 including means for maintaining an index of the current row in said first bit map and said end-of-message bit map, and incrementing said index of the current row if all bits in the current row are in said given condition.

21. Apparatus according to claim 16 wherein said first bit map is a data array having M rows of N bits per row, and is of the same size as said window.

22. Apparatus according to claim 21 wherein said end-to-message bit map is a data array having M rows of N bits per row.

23. Apparatus according to claim 22 wherein N is a power of 2 and equal to the data path width of processing means in said apparatus, and wherein M is a power of 2, and said window is of a size M times N.

24. Apparatus according to claim 16 including means for maintaining a first multi-bit value having an indicator bit for each row of said first bit map with all bits in said given condition, generating a table of said first multi-bit values for all combinations of bits, and looking up in said table a new first multi-bit value when a sequence number is received.

25. A packet data transmission system employing packet sequence numbers assigned in order, comprising, at a receiving station:

a) means for defining an acceptable range of said sequence numbers, said acceptable range beginning at a base sequence number and extending for a window which is a small fraction of the available sequence numbers;

b) means for comparing the sequence number of each message packet received with said acceptable range, and for discarding all message packets having sequence numbers not within said range;

c) means for maintaining a first bit map, each bit of said bit map being in a set or not-set condition, and for indexing into said first bit map to a bit position representing the sequence number of a received packet;

d) means for checking said bit position in said first bit map for said received packet, and discarding said received packet if the bit at said bit position is already in said set condition, or changing the bit at said bit position to a set condition if in said not-set condition.

26. Apparatus according to claim 25 including means for checking to determine if an incoming packet is an end-of-massage packet, and, if so, changing to a set condition a corresponding bit in an end-of-message bit map indexed by sequence number.

27. Apparatus according to claim 26 including means for checking to determine if all sequence numbers prior to said corresponding bit in said end-of-message bit map are in said set condition in said first bit map, and, if so, providing an end-of-message indication.

28. Apparatus according to claim 27 including means for zeroing all bits in said end-of-message bit map up to the current sequence number if said end-of-message indication is provided.

29. Apparatus according to claim 26 including means for maintaining an index of the current row in said first bit map and said end-of-message bit map, and incrementing said index of the current row if all bits in the current row are set in said set condition.

30. Apparatus according to claim 26 wherein said first bit map is a data array having M rows of N bits per row.

31. Apparatus according to claim 30 wherein said end-of-message bit map is a data array having M rows of N bits per row.

32. Apparatus according to claim 31 wherein N is a power of 2 and equal to the data path width of processing means in said apparatus, and wherein M is a power of 2, and said window is of a size M times N.

33. Apparatus according to claim 32 wherein said sequence number is at least a 32-bit number.

34. Apparatus according to claim 25 including means for maintaining a first multi-bit value having a bit indicating each row of said first bit map with all bits in said set condition, generating a table of said first multi-bit values for all combinations of bits, and looking up in said table a new first multi-bit value when a sequence number is received.

* * * * *